US012075004B2

(12) United States Patent
Anderson et al.

(10) Patent No.: US 12,075,004 B2
(45) Date of Patent: *Aug. 27, 2024

(54) CALL ROUTING TO AN INSTANCE OF CONFERENCING SOFTWARE

(71) Applicant: Zoom Video Communications, Inc., San Jose, CA (US)

(72) Inventors: Walter F. C. Anderson, Santa Cruz, CA (US); Vi Dinh Chau, Seattle, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,947

(22) Filed: Dec. 29, 2022

(65) Prior Publication Data

US 2023/0145272 A1 May 11, 2023

Related U.S. Application Data

(63) Continuation of application No. 17/243,186, filed on Apr. 28, 2021, now Pat. No. 11,575,792.

(51) Int. Cl.
*H04M 3/56* (2006.01)
*H04M 3/493* (2006.01)

(52) U.S. Cl.
CPC ........... *H04M 3/563* (2013.01); *H04M 3/493* (2013.01)

(58) Field of Classification Search
CPC .............................. H04M 3/563; H04M 3/493
USPC ............ 379/202.01, 204.01, 205.01, 211.02, 379/88.01
See application file for complete search history.

(56) References Cited

U.S. PATENT DOCUMENTS

| 6,978,002 | B1 | 12/2005 | Cope et al. |
| 8,325,901 | B1 | 12/2012 | Dolan et al. |
| 10,693,773 | B2 | 6/2020 | Broadworth et al. |
| 11,089,134 | B1 * | 8/2021 | Gordon ................. H04W 4/023 |
| 2007/0133521 | A1 | 6/2007 | McMaster |

(Continued)

FOREIGN PATENT DOCUMENTS

WO 2012001016 A1 1/2012

OTHER PUBLICATIONS

International Search Report and Written Opinion mailed on Jun. 30, 2022 in corresponding PCT Application No. PCT/US2022/024825.

*Primary Examiner* — Thjuan K Addy
(74) *Attorney, Agent, or Firm* — Young Basile Hanlon & MacFarlane, P.C.

(57) ABSTRACT

A conference service number system enables the reconfiguration of an existing telephone number as a service number usable for selectively routing calls to each of a client endpoint and a dedicated conference software instance. A conferencing system implements separate conferencing software instances for individual operators for whom unique telephone numbers, are assigned. A telephony system facilitates calls to and from telephone numbers and implements a menu system (e.g. an interactive voice response (IVR) menu) for presenting a caller with options to either route a call to a specific telephone number to the subject operator (e.g., to a client device of that operator) or to a conferencing software instance implemented specifically for that operator. The call is accordingly routed to either a device of the operator or to the conferencing software instance based on the selection by the caller.

20 Claims, 6 Drawing Sheets

(56) References Cited

U.S. PATENT DOCUMENTS

2007/0250567 A1 10/2007 Graham et al.
2010/0304729 A1 12/2010 Sabotta et al.

* cited by examiner

CALL ROUTING TO AN INSTANCE OF CONFERENCING SOFTWARE

CROSS-REFERENCE TO RELATED APPLICATION(S)

This application is a continuation of U.S. application Ser. No. 17/243,186, filed Apr. 28, 2021, the entire disclosure of which is herein incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of conference service number systems and techniques therefor.

One aspect of this disclosure is a method. The method includes receiving a call to a telephone number assigned to an operator of a client device from a calling device, presenting in-call options for selection at the calling device in which a first in-call option is to route the call to the client device and a second in-call option is to route the call to an instance of conferencing software associated with the operator of the client device, and routing the call to the instance of conferencing software responsive to a selection of the second in-call option at the calling device.

Another aspect of this disclosure is an apparatus. The apparatus includes a memory and a processor configured to execute instructions stored in the memory. The instructions include instructions to receive a call to a number of a client device from a calling device, present in-call options for selection at the calling device, and route the call to an instance of conferencing software responsive to a selection of one of the in-call options at the calling device, in which the instance of conferencing software is associated with the number.

Yet another aspect of this disclosure is a system. The system includes a telephony system and a conferencing system. The telephony system is configured to route a call to a telephone number assigned to an operator of a client device to one of the client device or an instance of conferencing software associated with the operator of the client device based on a selection of an in-call option at a calling device from which the call is received. The conferencing system is configured to implement multiple instances of conferencing software including the instance of conferencing software.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Conventional conferencing software, such as which may be implemented using a UCaaS platform, allows users to call into a shared conference number for a conference service. A shared conference number is generally some telephone number which is uniquely assigned to the conference service and which prompts users to enter a conference identifier or passcode to admit the caller to the correct conference. A shared conference number is shared in that all users typically dial it to access the conference service.

Some conferencing software further allows users to call into a dedicated conference number which is configured specifically for a user of group of users of the conferencing software, for example, a customer of a UCaaS platform, such as a company or other entity. Because the dedicated conference number is specific to a certain user or group of users, not all users of the conference service will dial it. Furthermore, a dedicated conference number may be configured so that a separate conference identifier or passcode is not required to enter a conference.

In some cases, conferencing software may allow individual users to configure a dedicated conference number specific to himself or herself. For example, a UCaaS platform may generate a new, unique, dedicated number specific to a platform user and assign same as a bridge line for the user. However, this introduces computational complexity by requiring the system to continue isolating and assigning unique numbers for specific use by only certain platform users. This approach also burdens conference participants who must either remember these different numbers or access a system which keeps track of these numbers, rather than simply calling into a direct telephone number of the platform user.

Implementations of this disclosure address problems such as these using a conference service number system through which an existing telephone number is reconfigured as a service number usable for selectively routing calls to each of a client endpoint and a dedicated conference software instance. A conferencing system, such as of a UCaaS or other software platform, implements separate conferencing software instances for individual operators for whom unique telephone numbers, either as full numbers or extensions, are assigned. A telephony system, such as of the UCaaS or other software platform, facilitates calls (e.g., voice over internet protocol (VOIP) calls) to and from telephone numbers and implements a menu system (e.g. an interactive voice response (IVR) menu) for presenting a caller with options to either route a call to a specific telephone number to the subject operator (e.g., to a client device of that operator) or to a conferencing software instance implemented specifically for that operator. The call is accordingly routed to either a device of the operator or to the conferencing software instance based on the selection by the caller.

Figure 1:
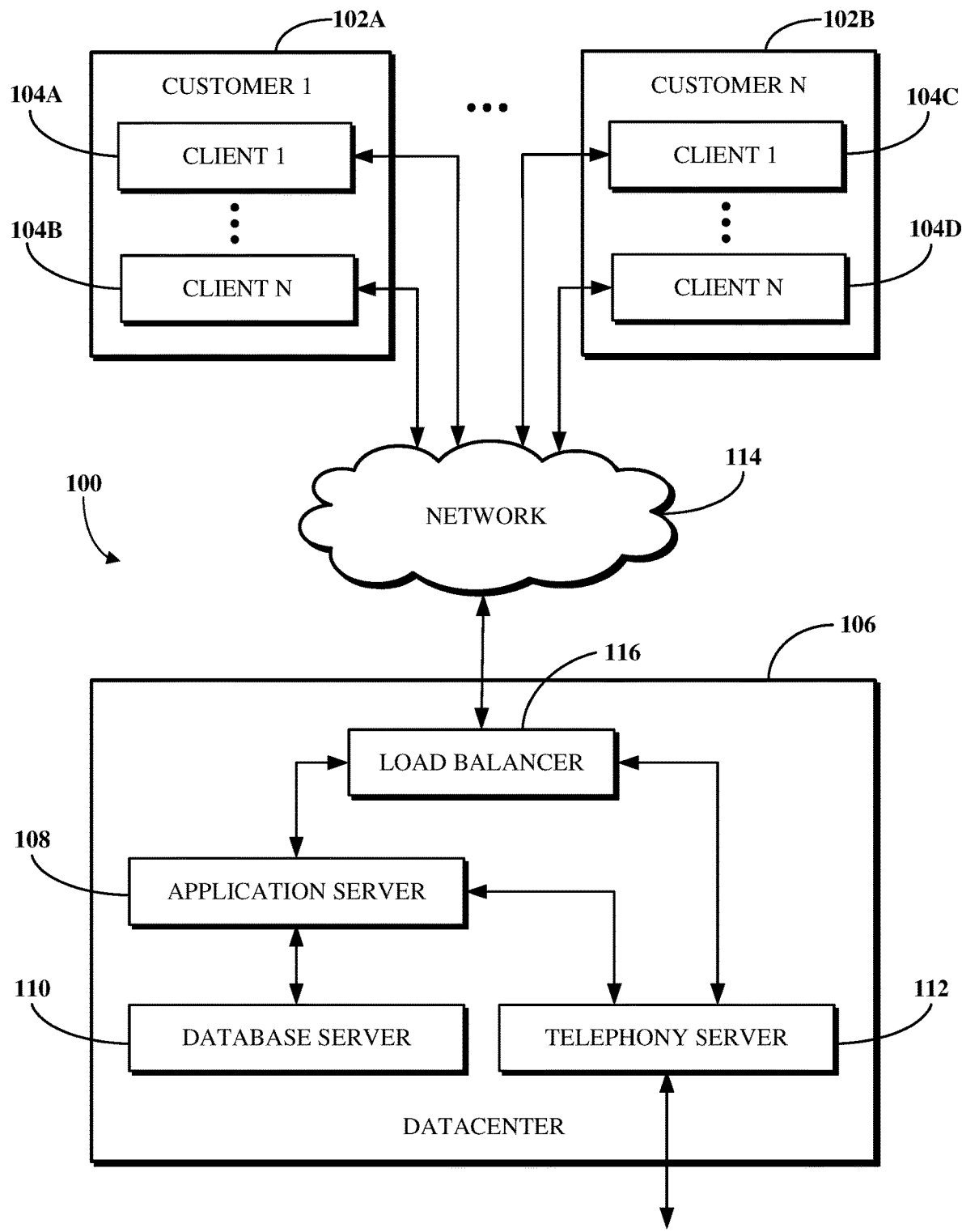
FIG. 1 is a block diagram of an example of an electronic computing and communications system.

To describe some implementations in greater detail, reference is first made to examples of hardware and software structures used to implement a conference service number system. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be VOIP-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
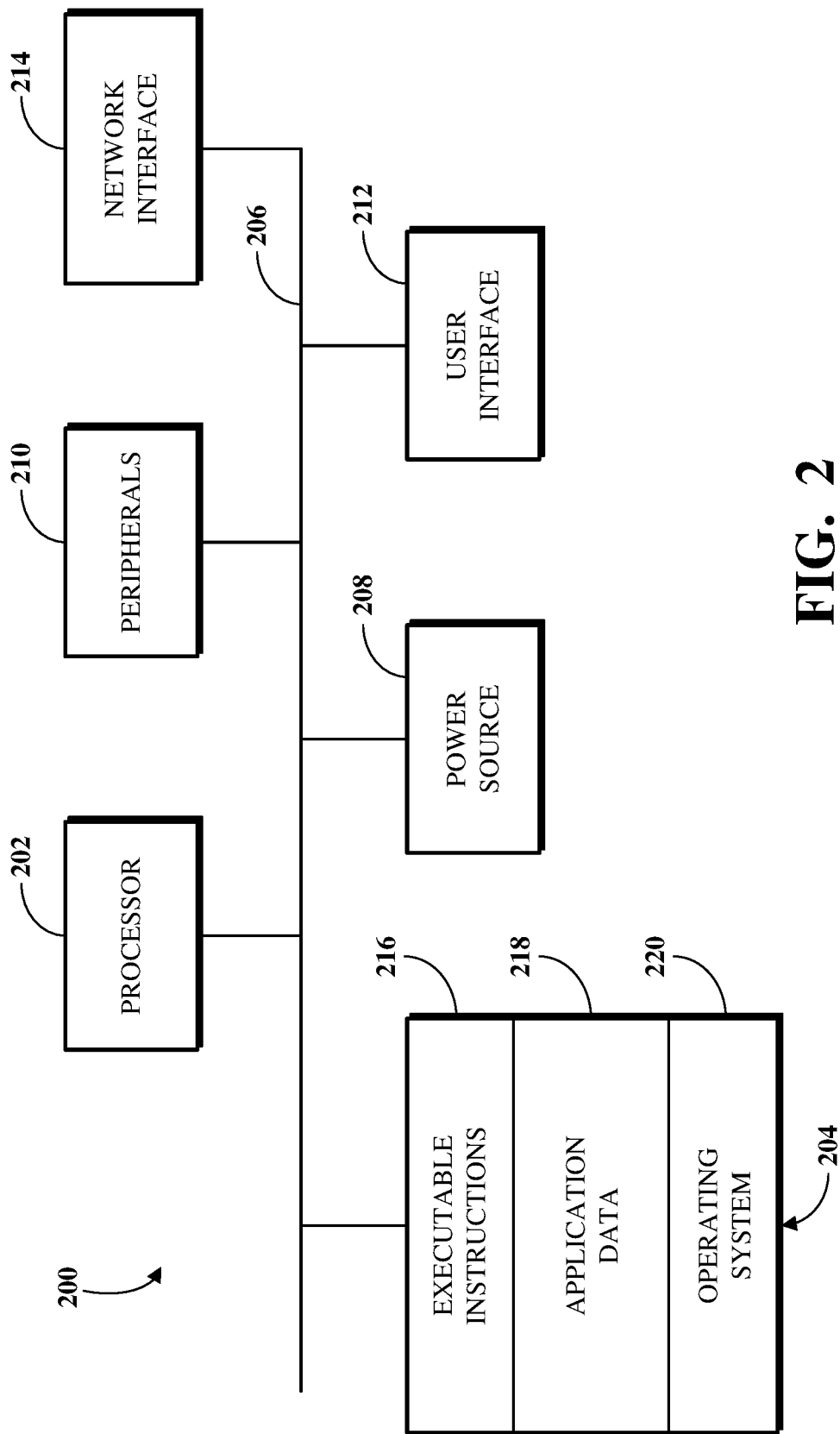
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
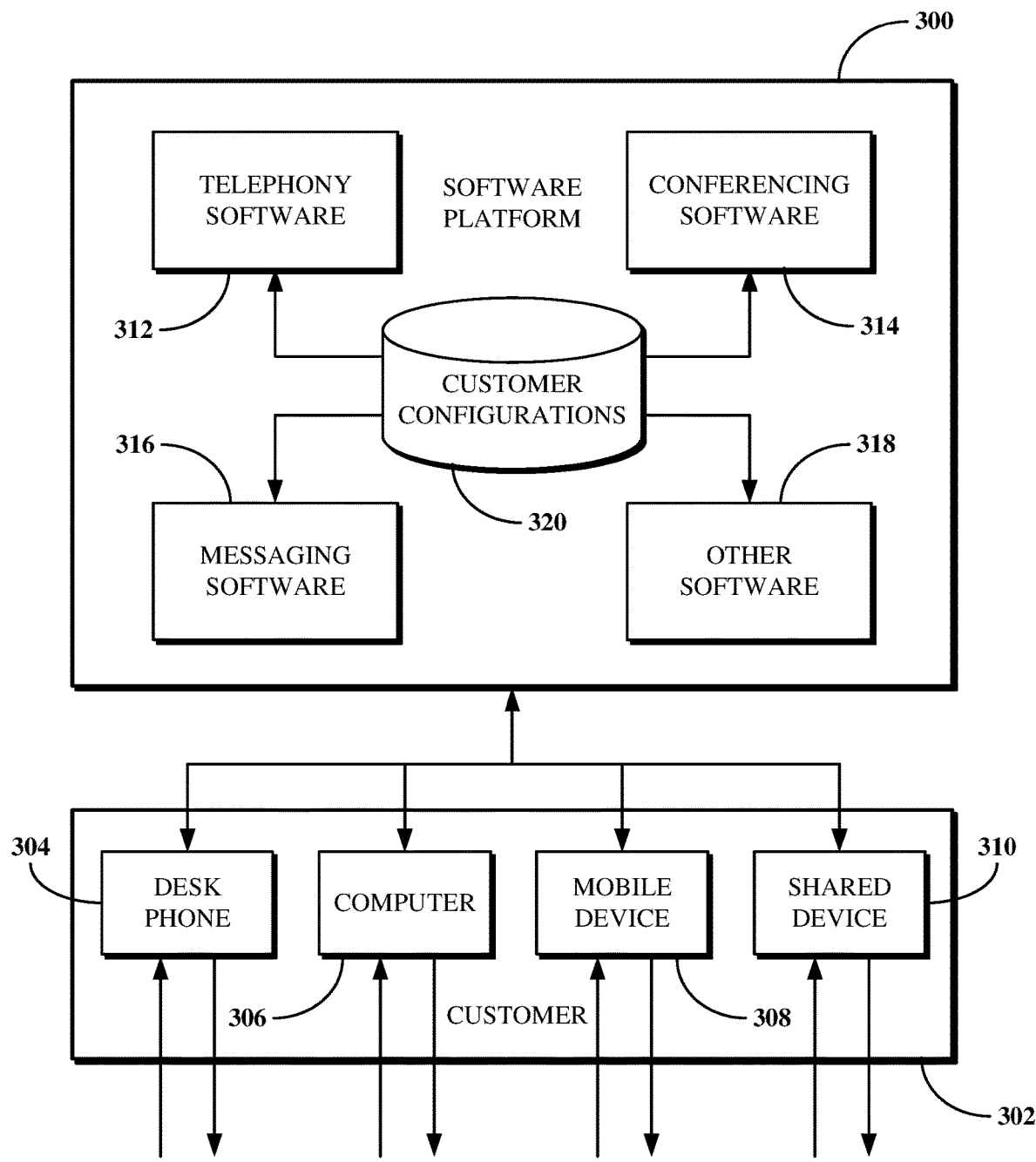
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4:
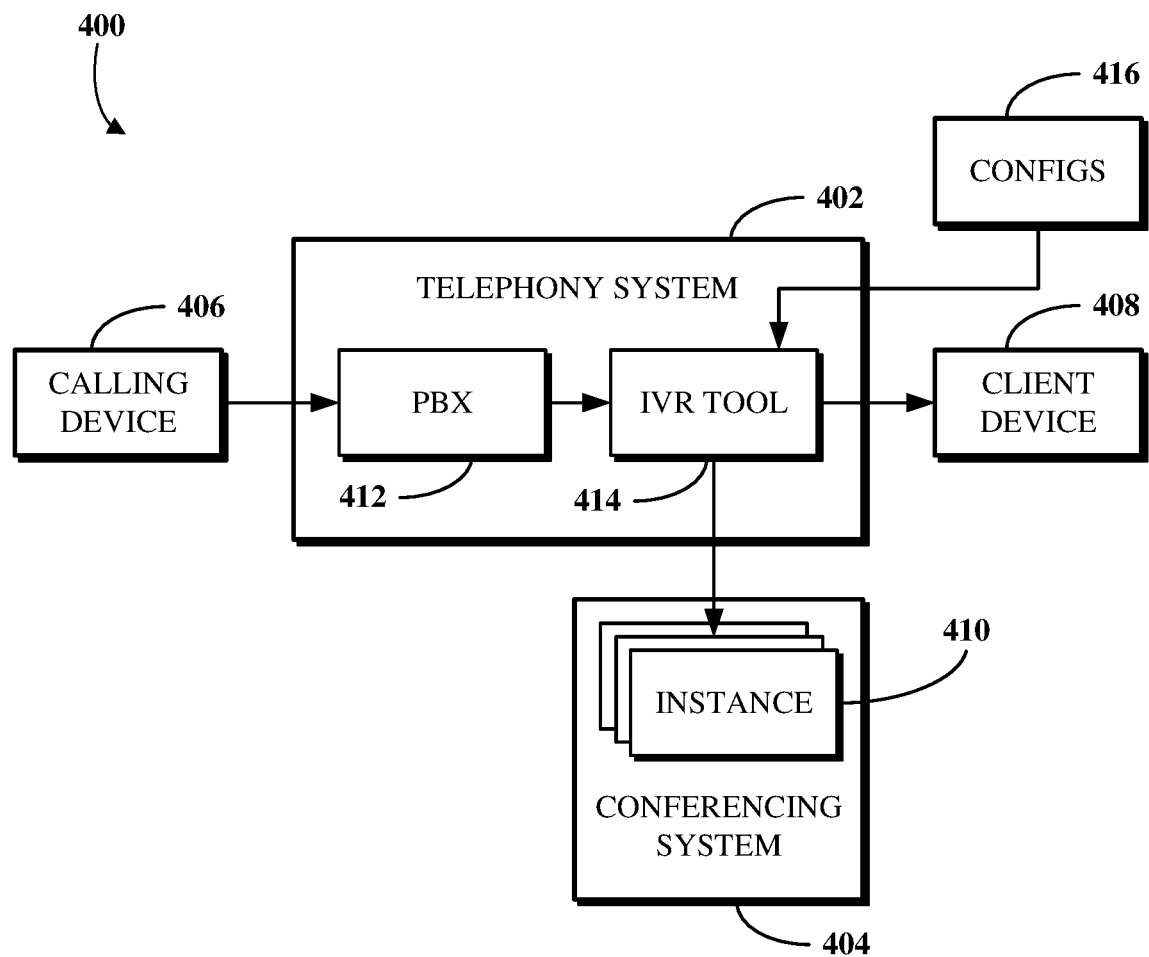
FIG. 4 is a block diagram of an example of a conference service number system.

FIG. 4 is a block diagram of an example of a conference service number system 400, which includes a telephony system 402 and a conferencing system 404. The telephony system 402 includes hardware and/or software configured to receive calls from calling devices, such as a calling device 406, and route those calls to call destinations, which include client devices, such as a client device 408, and instances of conferencing software 410. The conferencing system 404 includes hardware and/or software configured to implement the instances of conferencing software 410.

A telephone number is assigned to an operator of the client device 408. The client device 408 is configured to receive calls to the telephone number which are routed to the client device 408 using the telephony system 402. One of the instances of conferencing software 410 is associated with the operator of the client device 408, and the conferencing system 404 is configured to connect calls to the telephone number associated with the operator of the client device 408 which are routed to the conferencing system 404 to that instance of conferencing software. The operator may, for example, be a human user of the client device 408, a software intelligence unit configured to use the client device 408, or another entity configured for operation of the client device 408.

The telephony system 402, which may, for example, be or include the telephony server 112 shown in FIG. 1, includes a PBX 412 and an IVR tool 414. The PBX 412 includes software for answering calls received from calling devices, such as the calling device 406, and for routing those calls to the IVR tool 414. The IVR tool 414 includes software for configuring IVR menus and presenting in-call options of an IVR menu for selection at a calling device. Generally, an IVR menu configured using the IVR tool 414 includes a first in-call option for routing a call to a telephone number associated with an operator of a client device to that client device (e.g., the client device 408) and a second in-call option for routing the call to an instance of the instances of conferencing software 410 associated with the operator of the client device. In some implementations, an IVR menu may include additional or different in-call options.

In some implementations, the IVR tool 414 uses configurations 416 to configure one or more of the IVR menus. For example, the configurations 416 may include one or more of call destinations to which to enable routing of calls to a subject telephone number, expiration dates or times for temporary call destinations, rules for temporarily or permanently restricting call destinations, or the like. In some such implementations, the client device operators may enter the configurations 416 for use with the IVR tool 414. In other such implementations, the configurations 416 may by default be provided by the conference service number system 400.

In some implementations, the IVR tool 414 may be external to the telephony system 402. For example, the IVR tool 414 may be implemented by a service associated with the telephony system 402, a customer of a software platform (e.g., the software platform 300 shown in FIG. 3), or another system or entity. In some such implementations, one or more edge components of the telephony system 402, for example, a SBC associated with the PBX 412, can be used to facilitate a routing of a call to a telephone number through the PBX 412 to an IVR menu configured using the IVR tool 414.

The conferencing software implemented by the conferencing system 404 may include an event handler that receives a signal transmitted from the telephony system 402 and determines an instance of the instances of conferencing software 410 to which to connect a call based on the contents of the signal. Alternatively, the conferencing system 404 may include an event handler separate from the conferencing software that listens for a signal transmitted from the telephony system 402 and determines an instance of the instances of conferencing software 410 to which to connect a call based on contents of the signal. In either case, the telephony system 402 signals to the conferencing system 404 a conference identifier associated with the operator of the client device 408 or with the telephone number to cause a channel to open between the calling device 406 and the subject instance of conferencing software. An instance of conferencing software may, for example, refer to the conferencing software 314 shown in FIG. 3.

The instances of conferencing software 410 can be persistent such that they are always running even when a conference is not active or otherwise has no participants. Alternatively, an instance of the instances of conferencing software 410 may be implemented in response to an event, for example, a conference being initiated by the operator of the client device 408, the operator of the calling device 406, or another party.

In some implementations, where the operator of the calling device 406 selects to connect to the instance of conferencing software 410 associated with the operator of the client device 408, the operator of the client device 408 receives a notification that the operator of the calling device 406 has connected to that instance of conferencing software 410. For example, the telephony system 402 can send a call to the client device 408 to alert the operator of the client device 408 that the operator of the calling device 406 has connected to the instance of conferencing software 410. In another example, the conferencing system 404 can transmit an alert to a client application running on the client device 408 to alert the operator of the client device 408 that the operator of the calling device 406 has connected to the instance of conferencing software 410.

In some implementations, the conference service number system 400 is configured to detect a disconnection of the calling device 406 from an active call to a telephone number, which may be referred to as a first call. In some such implementations, the conference service number system 400, using the telephony system 402, may thereafter receive a second call to the same telephone number from the calling device 406, determine the in-call option selected at the calling device 406 as part of the first call, and responsively present an in-call option prompting the calling device 406 to reconnect to the same call destination. For example, where the calling device 406 becomes disconnected from an instance of conferencing software and another call is received from the calling device 406 to the same telephone number, the conference service number system 400 can present an option, through an IVR menu or otherwise, for the operator of the calling device to select to reconnect to that same instance of conferencing software. In some such implementations, the presentation of that option to reconnect to the call destination may include an audio identification of the call destination.

The conference service number system 400 is extensible to support multiple telephone numbers and route same to client devices and ones of the instances of conferencing software 410 associated with other operators. For example, the conference service number system 400 can route calls to a first telephone number assigned to a first client device operator to either a client device associated with that first operator or a first instance of conferencing software associated with that first operator using a first IVR menu, route calls to a second telephone number assigned to a second client device operator to either a client device associated with that second operator or a second instance of conferencing software associated with that second operator using a second IVR menu, and so on.

In some implementations, some or all operators associated with a customer of a software platform, for example, the software platform 300 shown in FIG. 3, may be assigned telephone numbers which can be routed to separate client devices and separate ones of the instances of conferencing software 410. For example, separate instances of the conferencing software may be assigned to different operators associated with a customer of a software platform. Separate IVR menus are configured for those operators such as to process calls to the specific telephone numbers associated with those individual operators.

In some implementations, the IVR tool 414 may be omitted. For example, an operator of the client device 408 may at the client device 408 answer a call from the calling device 406 to a telephone number associated with the operator of the client device 408. The call may, for example, be directly routed to the client device 408 or routed to the client device 408 through the instance of conferencing software 410 associated with the operator of the client device 408. In either case, upon a second call to the same telephone number being received, the second call is reported as an incoming call to the operator of the client device 408. In some such implementations, the operator of the client device 408 may then choose to dismiss the second call, answer the second call including by placing the current call on hold, or merge the current call and the second call into a conference implemented at the instance of conferencing software 410 associated with the operator of the client device 408.

In some implementations, the IVR tool 414 may skip presenting options for selection at the calling device 406 where the operator of the client device 408 is participating in a call or conference when a call from the calling device 406 is received. For example, the conferencing system 404 may indicate when the operator of the client device 408 is participating in a conference implemented by the conferencing system 404, in particular, the instance of conferencing software 410 associated with the operator of the client device 408. The conferencing system 404 may indicate that the operator of the client device 408 is participating in a conference in response to a call received from the calling device 406, in response to the operator of the client device 408 connecting to the conference, in response to a determination that the operator of the client device 408 has a conference scheduled at a particular time, or otherwise. For example, where a call to a telephone number associated with the operator of the client device 408 is received from the calling device 406 and the operator of the client device 408 is at that time participating in a conference implemented using the instance of conferencing software 410 or otherwise has a conference scheduled for that time, the telephony system 402 may automatically route the call to the instance of conferencing software 410. In some such implementations, the automatic routing of the call to the instance of conferencing software 410 cause the operator of the calling device 406 to connect to the instance of conferencing software 410 without further operator input. In some such implementations, the client device 408 may configure the instance of conferencing software 410 such that the operator of the calling device 406 must be manually admitted to the instance of conferencing software 410 before he or she is allowed to fully connect thereto.

Figure 5:
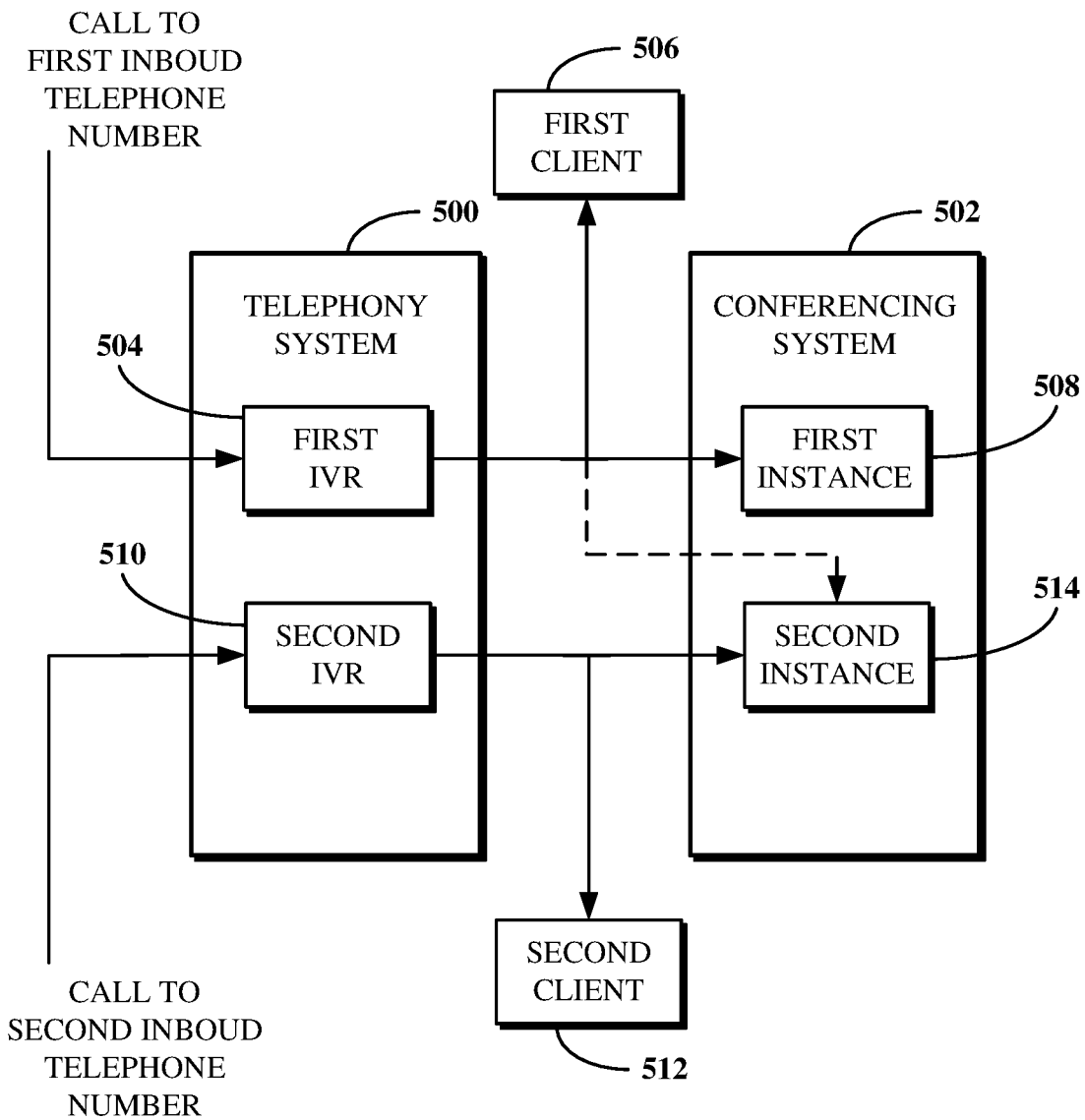
FIG. 5 is a block diagram of examples of calls to telephone numbers being routed in a conference service number system.

FIG. 5 is a block diagram of examples of calls to telephone numbers being routed in a conference service number system, which may, for example, be the conference service number system 400 shown in FIG. 4. As shown first and second calls, respectively to first and second telephone numbers, are each routed through a telephony system 500 to either a client device or an instance of conferencing software implemented by a conferencing system 502. The telephony system 500 and the conferencing system 502 may, for example, be the telephony system 402 and the conferencing system 404 shown in FIG. 4.

In particular, a call to a first telephone number is received at the telephony system 500, such as from a calling device, which may, for example, be the calling device 406 shown in FIG. 4 or another calling device. Based on that call, the telephony system 500 presents a first IVR menu 504 with in-call options selectable at the calling device. The first IVR menu 504 may be an IVR menu of the IVR tool 414 shown in FIG. 4 or another IVR menu. A first in-call option of the first IVR menu 504 is configured to route the call to a first client device 506, which may, for example, be the client device 408 shown in FIG. 4 or another client device. A second in-call option of the first IVR menu 504 is configured to route the call to a first instance of conferencing software 508 implemented by the conferencing system 502.

Similarly, a call to a second telephone number is received at the telephony system 500, such as from a calling device, which may, for example, be the calling device 406 shown in FIG. 4 or another calling device. Based on that call, the telephony system 500 presents a second IVR menu 510 with in-call options selectable at the calling device. The second IVR menu 510 may be an IVR menu of the IVR tool 414 shown in FIG. 4 or another IVR menu. A first in-call option of the second IVR menu 510 is configured to route the call to a second client device 512, which may, for example, be the client device 408 shown in FIG. 4 or another client device. A second in-call option of the second IVR menu 510 is configured to route the call to a second instance of conferencing software 514 implemented by the conferencing system 502.

In some implementations, an IVR menu of the conference service number system may be configured to route calls to associated telephone numbers to destinations other than a client device of a particular operator or an instance of conferencing software implemented for that operator. For example, the first IVR menu 504 may be configured with an in-call option that, when selected at a calling device, routes the call to the second instance of conferencing software 514. In some such implementations, the operator associated with a given telephone number may have privileges to add, delete, and/or modify the configurations for the corresponding IVR menu. For example, software associated with the software platform may include functionality for allowing an operator to configure the in-call options of the IVR menu. In one such example, the operator of the first client device 506 may configure the first IVR menu 504 to include an in-call option for routing a call to the telephone number to the second instance of conferencing software 514.

In some such implementations, the second instance of conferencing software 514 may be associated with a group of client device operators rather than with a single client device operator. For example, the second instance of conferencing software 514 may be an instance of conferencing software implemented for a customer of a software platform, for example, the software platform 300 shown in FIG. 3. In some such implementations, the second telephone number may be a telephone number for the customer rather than an individual client device operator. For example, calling the telephone number may result in the calling device being connected to an auto-attendant receptionist which uses an IVR menu to allow calls to be routed to the instance of conferencing software implemented for the customer and/or to one or more individual client device operators of the customer. Thus, in one example, an operator of the calling device may dial a telephone number for an office, be greeted by an IVR menu with in-call options for directing their call to some destination, and route the call to the instance of conferencing software implemented for the customer responsive to a selection of one of the in-call options at the calling device.

In other such implementations, the operator of the first client device 506 may be a participant in a conference implemented by the second instance of conferencing software 514. In some such implementations, the operator of the first client device 506 may configure the first IVR menu 504 with an in-call option for routing calls to the second instance of conferencing software 514. In some such implementations, the in-call option of the first IVR menu 504 for routing calls to the second instance of conferencing software 514 may be configured with an expiration date or time. For example, upon the expiration date or time being reached, the first IVR menu 504 may automatically me modified to no longer include the in-call option for routing calls to the second instance of conferencing software 514. In one such example, this may useful where a first operator associated with the first telephone number is participating in a conference hosted by a second operator and wants someone who calls into the first telephone number to be able to join the conference hosted by the second operator.

In some such implementations, the telephony system 500 receives an indication that the operator of the first client device 506 is participating in the conference implemented by the second instance of conferencing software 514 or otherwise that the operator of the first client device 506 is scheduled to participate in such a conference (e.g., based on a calendar of the operator of the first client device 506 or other data available to the telephony system 500 or the conferencing system 502). In such a case, upon a call to the first inbound telephony number being received, the call may be routed to the second instance of conferencing software 514. For example, the routing may be automatically performed responsive to a determination that the operator of the calling device from which the call to the first inbound telephone number is received is on a list of participants for the conference implemented by the second instance of conferencing software 514.

Although two sets of telephone numbers, IVR menus, client devices, and instances of conferencing software are shown in FIG. 5, the conference service number system of FIG. 5 may be used for other numbers of telephone numbers, IVR menus, client devices, and instances of conferencing software. In some examples, there may be tens or hundreds of sets of telephone numbers, IVR menus, client devices, and instances of conferencing software implemented for a single customer of a software platform or for another single entity.

Figure 6:
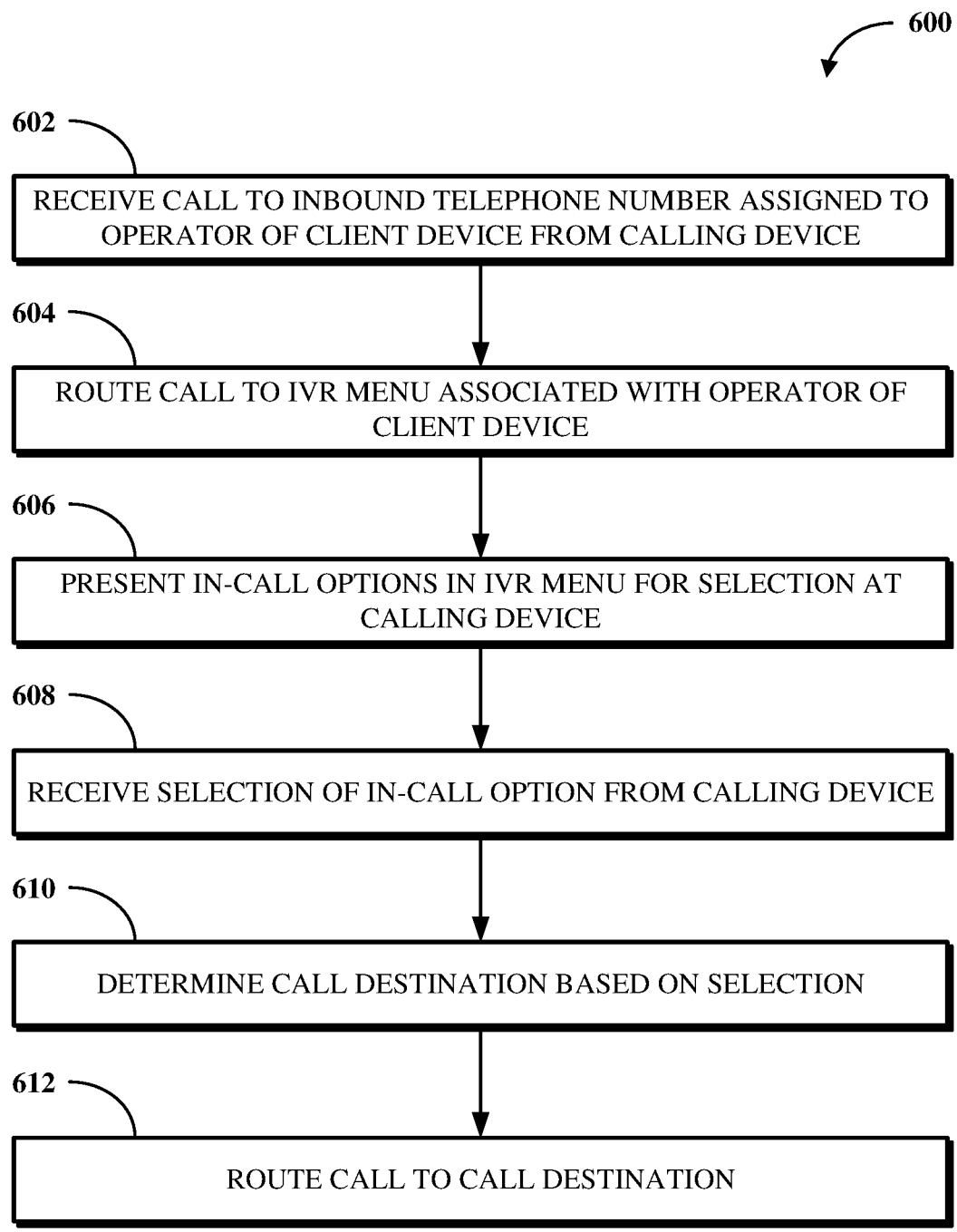
FIG. 6 is a flowchart of an example of a technique for routing a call to a telephone number in a conference service number system.

To further describe some implementations in greater detail, reference is next made to examples of techniques which may be performed by or using a conference service number system. FIG. 6 is a flowchart of an example of a technique 600 for routing a call to a telephone number in a conference service number system. The technique 600 can be executed using computing devices, such as the systems, hardware, and software described with respect to FIGS. 1-6. The technique 600 can be performed, for example, by executing a machine-readable program or other computer-executable instructions, such as routines, instructions, programs, or other code. The steps, or operations, of the technique 600 or another technique, method, process, or algorithm described in connection with the implementations disclosed herein can be implemented directly in hardware, firmware, software executed by hardware, circuitry, or a combination thereof.

For simplicity of explanation, the technique 600 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 602, a call to a telephone number assigned to an operator of a client device is received from a calling device. The telephone number is a full telephone number or extension which is unique to the operator of the client device. The call may be received by a PBX over a native PSTN implemented by a telephony service provider associated with the operator of the client device or a customer of a software platform with which the operator of the client device is associated. Alternatively, the call may be received by a PBX over an external PSTN separate from that which is implemented by the telephony service provider.

At 604, the call is routed to an IVR menu associated with the operator of the client device. The IVR menu includes one or more in-call options for selection at the calling device. The one or more in-call options may be set by default. Alternatively, the one or more in-call options may be configured, for example, by the operator of the client device or by another person or entity. Each of the one or more in-call options corresponds to a call destination to which the call can be routed. In particular, the one or more in-call options include at least a first in-call option to route the call to the client device of the operator and a second in-call option is to route the call to an instance of conferencing software associated with the operator of the client device.

At 606, the in-call options of the IVR menu are presented for selection at the calling device. Presenting the in-call options of the IVR menu at the calling device includes transmitting an audio stream representative of the in-call options to the calling device. For example, the audio stream may be encoded at the telephony system from which the IVR menu is implemented and decoded at the calling device.

At 608, a selection of an in-call option of the in-call options of the IVR menu is received from the calling device. The selection of the in-call option indicates the in-call option and thus the call destination to which the call will be routed. The selection of the in-call option can be received through the PBX. For example, the selection can be received as part of an audio stream received from the calling device, such as where the selection of the in-call option is made by the operator of the calling device speaking the in-call option or an identifier (e.g., a number) associated therewith. In another example, the selection can be received as data within a bitstream received from the calling device, such as where the selection of the in-call option is made by the operator of the calling device pressing a soft or physical button (e.g., of a telephone keypad) at the calling device.

At 610, a call destination is determined based on the selection of the in-call option. Determining the call destination can include processing the audio stream, bitstream, or other information received from the calling device to identify which in-call option was selected and thereafter determining which call destination is associated with that in-call option. For example, the call destination associated with an in-call option can be determined based on a mapping between call destinations and in-call options defined within a configuration of the IVR menu.

At 612, the call is routed to the call destination. Where a first in-call option to route the call to the client device of the operator is selected at the calling device such that the call destination is the client device, routing the call to the call destination can include routing the call to the client device responsive to a selection of the first in-call option at the calling device. Alternatively, where a second in-call option to route the call to the instance of conferencing software associated with the operator of the client device is selected at the calling device such that the call destination is the instance of conferencing software, routing the call to the call destination can include routing the call to the instance of conferencing software responsive to a selection of the second in-call option at the calling device. Routing the call to the instance of conferencing software can include signaling a conference identifier associated with the telephone number or the operator of the client device to a server implementing the instance of conferencing software to cause a channel to open between the calling device and the instance of conferencing software.

In some implementations, the one or more in-call options may include a third in-call option. In one example, the third in-call option may be to route the call to a different instance of conferencing software which is associated with an operator other than the operator of the client device. For example, the different instance of conferencing software, which may also be referred to as a second instance of conferencing software, may be an instance of conferencing software associated with another client device operator of a customer of a software platform or of another entity. In another example, the second instance of conferencing software may be an instance of conferencing software associated with a customer of a software platform or with another entity, such as a general conference line accessible to one or more client device operators. In some such implementations, routing the call to the call destination can include routing the call to the second instance of conferencing software responsive to a selection of the third in-call option at the calling device.

In some implementations, the technique 600 can include configuring the IVR menu associated with the operator of the client device. For example, configuring the IVR menu associated with the operator of the client device can include configuring in-call options of the IVR menu and/or configuring conditions of those in-call options. For example, configuring the in-call options can include adding, removing, or modifying in-call options from the IVR menu. For example, where an IVR menu includes a first in-call option for routing a call to a client device and a second in-call option for routing a call to a first instance of conferencing software, the IVR menu may be configured to add a third in-call option for routing a call to a second instance of conferencing software. In another example, configuring conditions of the in-call options may include defining an expiration date or time for one or more of those in-call options. For example, a newly added in-call option (e.g., the third in-call option described above) can be configured to be presented and selectable only for a certain period of time.

In some implementations, after the call is routed to the call destination, the technique 600 can include detecting a disconnection of the calling device from the call, which may be referred to as a first call. For example, a telephony system routing the call to the call destination can determine that the calling device has disconnected based on an event pushed to the telephony system, based on a sudden drop in packet transmission, or based on other criteria. Responsive to detecting that disconnection of the calling device from the first call, a second call to the telephone number can be received from the calling device. The earlier in-call option selection made at the calling device as part of the first call can be determined, for example, based on a saving of data indicative of that earlier in-call option selection and retrieval of such data. An in-call option may then be presented to the calling device during the second call prompting the calling device to reconnect to the same call destination. For example, responsive to determining that the selection of the second in-call option was received from the calling device as part of the first call, an in-call option prompting the calling device to reconnect to the instance of conferencing software may be presented to the calling device.

In some implementations, the technique 600 may include routing a call from a calling device to a conference implemented by an instance of conferencing software instead of presenting the IVR menu options associated with the operator of the client device. For example, the technique 600 may include determining that the operator of the client device is participating in a conference implemented by an instance of conferencing software or is scheduled to participate in a conference implemented by an instance of conferencing software at a time in which a call to a telephone number associated with the operator of the client device is received. Responsive to that determination, the technique 600 may omit presenting the IVR menu options for selection at the calling device and instead route the calling device to the conference implemented by the instance of conferencing software.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    presenting, at a calling device from which a call to a telephone number is received, options for selection at the calling device during the call, wherein a first option is to route the call to a device of a software user, and wherein a second option is to route the call to an instance of conferencing software associated with the software user according to a configuration of a conferencing service associated with the conferencing software; and
    routing the call according to a selection of one of the options at the calling device during the call.

2. The method of claim 1, wherein the options are of an interactive voice response menu.

3. The method of claim 1, wherein the configuration causes a connection of calls to the telephone number to the instance of the conferencing software.

4. The method of claim 1, wherein a third option is to route the call to a second instance of the conferencing software associated with a second software user.

5. The method of claim 1, wherein other instances of the conferencing software are associated with other software users.

6. The method of claim 1, wherein the options are presented by a telephony system of a unified communications as a service software platform, and wherein the conferencing software is implemented by a conferencing system of the unified communications as a service software platform.

7. The method of claim 1, wherein a selection of the second option at the calling device causes a channel to open between the calling device and the instance of the conferencing software.

8. The method of claim 1, comprising:
    based on a disconnection of the calling device from the call, presenting, at the calling device during a second call to the telephone number, an option to reconnect the calling device to a call destination associated with the one of the options selected at the calling device.

9. A non-transitory computer readable medium storing instructions operable to cause one or more processors to perform operations comprising:
    presenting, at a calling device from which a call to a telephone number is received, options for selection at the calling device during the call, wherein a first option is to route the call to a device of a software user, and wherein a second option is to route the call to an instance of conferencing software associated with the software user according to a configuration of a conferencing service associated with the conferencing software; and
    routing the call according to a selection of one of the options at the calling device during the call.

10. The non-transitory computer readable medium of claim 9, wherein, based on a selection of the second option at the calling device, a conference identifier associated with the instance of the conferencing software is signaled to a server implementing the instance of the conferencing software.

11. The non-transitory computer readable medium of claim 9, wherein the options are configured by the software user or an entity associated with the software user.

12. The non-transitory computer readable medium of claim 9, wherein one or more of the options are configured according to an expiration date or an expiration time.

13. The non-transitory computer readable medium of claim 9, wherein separate instances of the conferencing software are assigned to different software users.

14. The non-transitory computer readable medium of claim 9, wherein the options are presented and the call is routed using software of a unified communications as a service software platform.

15. An apparatus, comprising:
    a memory; and
    a processor configured to execute instructions stored in the memory to:
    present, at a calling device from which a call to a telephone number is received, options for selection at the calling device during the call, wherein a first option is to route the call to a device of a software user, and wherein a second option is to route the call to an instance of conferencing software associated with the software user according to a configuration of a conferencing service associated with the conferencing software; and
    route the call according to a selection of one of the options at the calling device during the call.

16. The apparatus of claim 15, wherein the processor is configured to execute the instructions to:
    route the call to an interactive voice response menu associated with the software user, wherein the options are of the interactive voice response menu.

17. The apparatus of claim 15, wherein the processor is configured to execute the instructions to:
    determine a call destination to which to route the call based on the one of the options selected at the calling device.

18. The apparatus of claim 15, wherein the processor is configured to execute the instructions to:
    detect a disconnection of the calling device from the call;
    receive a second call from the calling device to the telephone number; and
    present, at the calling device during the second call, an option to reconnect the calling device to a call destination associated with the one of the options selected at the calling device during the call.

19. The apparatus of claim 15, wherein the processor is configured to execute the instructions to:
    determine to automatically route the call to the instance of the conferencing software based on a determination that an operator of the calling device is participating in a conference implemented by the instance of the conferencing software.

20. The apparatus of claim 15, wherein the processor is configured to execute the instructions to:
determine to automatically route the call to the instance of the conferencing software based on a determination that an operator of the calling device is scheduled to participate in a conference implemented by the instance of the conferencing software.

* * * * *